United States Patent [19]

Scopes

[11] Patent Number: 4,813,712
[45] Date of Patent: Mar. 21, 1989

[54] INDICATING THE CONDITION OF A SURFACE

[75] Inventor: Peter E. Scopes, Ipswich, United Kingdom

[73] Assignee: Blockfoil Limited, Suffolk, England

[21] Appl. No.: 104,377

[22] Filed: Oct. 5, 1987

[30] Foreign Application Priority Data

Dec. 11, 1986 [GB] United Kingdom ............... 8629658

[51] Int. Cl.$^4$ ............... B42D 15/00; G09F 19/00; G09F 3/00; G01D 11/00
[52] U.S. Cl. ............... 283/114; 283/74; 283/91; 116/201
[58] Field of Search ............... 283/72, 74, 73, 101, 283/114, 91; 116/249, 250, 258, 315, 317, 335, 201; 446/416; 73/262; 137/505.36; 92/96, 103 R

[56] References Cited

U.S. PATENT DOCUMENTS

| | | | |
|---|---|---|---|
| 362,820 | 5/1887 | Craige | 283/74 |
| 1,422,527 | 7/1922 | Berger | 283/91 |
| 1,869,221 | 7/1932 | Latzko et al. | 116/201 |
| 4,066,280 | 1/1978 | La Capria | 283/91 |
| 4,184,700 | 1/1980 | Greenaway | 283/91 |
| 4,250,217 | 2/1981 | Greenaway | 283/91 |
| 4,589,686 | 5/1986 | McGrew | 283/91 |
| 4,711,690 | 12/1987 | Haghiri-Tehrani | 283/91 |
| 4,715,623 | 12/1987 | Roule | 283/74 |

FOREIGN PATENT DOCUMENTS 2254255  4/1975  France ............... 283/73

OTHER PUBLICATIONS

RCA Anti Counterfeit Label, TN No. 903, Feb. 1, 1972.

*Primary Examiner*—Frank T. Yost
*Assistant Examiner*—Paul M. Heyrana, Sr.
*Attorney, Agent, or Firm*—Kinzer, Plyer, Dorn, McEachran & Jambor

[57] ABSTRACT

A pattern is applied to a particular surface in order to detect whether that the surface is in a concave or convex state. One set of regions within the surface bear one color or other coherent appearance, and another set bear a different color or a different coherent appearance. When the surface is in a convex state, light is predominantly reflected from one set of regions, whereas, in the concave state light is reflected from the other set of regions. In this way a clearly visible indication is given of the state of the surface. The surface can, for example, be part of a vacuum pack containing foodstuffs so as to indicate whether the vacuum in the pack remains or has been broken.

18 Claims, 3 Drawing Sheets

INDICATING THE CONDITION OF A SURFACE

This invention relates to a method of indicating the condition of a surface, and to a surface treated so that its condition can be indicated.

The surface condition to be indicated is whether the surface takes up a concave or a convex form.

It is known in vacuum packaged goods such as foodstuffs, particularly baby foodstuffs, to have a metal lid to the jar or container, so that the lid is sucked into a concave shape (when seen from outside the jar) by the vacuum inside the jar. However if the vacuum should be broken, then the lid will relax and return to its initial, unstressed, convex shape.

This change of state is used to provide an easy indication of whether or not the vacuum in the jar exists or whether it has been broken. If the vacuum has been broken, the foodstuffs inside may have been tampered with, or the fact that air has entered may have caused the foodstuffs to deteriorate.

Vacuum packaging is used for a wide variety of perishable goods in both plastic and metal containers, and a simple and clear indication of whether or not the vacuum has been broken could be very useful.

According to the present invention, there is provided a method of indicating the condition of a surface which may take up a concave or a convex form, wherein a pattern is applied to the surface, the pattern having the characteristic of displaying one visible form when the surface is concave and a different visible form when the surface is convex.

The different visible forms may for example be colours or words. In one form the appearance of the surface may change from one colour to another colour when the form changes from concave to convex and vice versa, or alternatively the surface may display a word such as SAFE when in a concave form and a different word such as UNSAFE when the surface is in a convex form.

The invention also provides a surface which may take up a concave or a convex form, which surface has a pattern applied to it with the pattern having the characteristic of displaying one visible form when the surface is concave and a different visible form when the surface is convex.

The pattern may be an embossed pattern, having first regions corresponding to one visible form and second regions corresponding to a different visible form, all the first regions having a common characteristic orientation relative to the surface and all the second regions having a different common characteristic orientation relative to the surface such that when the surface takes up a concave form, light is reflected predominantly from said first regions and when the surface takes up a convex form, light is reflected predominantly from said second regions.

The embossed pattern can be regular or irregular. When regular, the embossing may produce a saw-toothed profile when seen in cross-section, with the flank on one side of one tooth carrying one visible form and the flank on the other side of the same tooth bearing a different visible form.

Where the pattern is irregular, it can be produced by indenting the surface with a generally spherically-tipped needle. This produces a series of small craters in the surface with the walls of the craters forming flanks of the pattern. Those flanks which face a certain direction and/or which lie at a certain angle to the surface can have a different colour applied to them than the rest of the surface. By irregular, we mean a pattern that is irregular on a small scale, although there may be a pattern repeat on a larger scale. Irregular embossed patterns can be produced by a programmed embossing head which moves over the surface to be embossed in an irregular but known path. The programme which controls movement of the embossing head may also control the laying down of the colours on the first and/or second regions.

Where the different visible forms are two different colours, one colour can be the natural colour of the substrate and the different colour can be an applied colour. The colour or colours can be laid down by a foil-blocking technique, by printing, or by any other suitable technique. A high degree of accuracy will be required to ensure that the colours register correctly with the embossed pattern. The colour can be laid down either before or after the embossing stage.

In an alternative form, the pattern may be formed by two superimposed layers which are displaced relative to one another when the surface changes between its concave and convex forms. The top layer then has a grid formation which allows light to be transmitted through some regions of the layer but not through formation when the surface is concave and the other of which registers with the grid formation when the surface is convex, such that when the surface is concave, light is reflected from said one of the patterns and when the surface is convex, light is reflected from the other of the patterns.

The top layer is preferably a transparent film to which opaque grid lines have been applied. The lines may be straight lines or curved lines, and the pattern on the lower layer will follow the same arrangement.

It is possible for the pattern to be on the surface of a substrate which itself is subsequently fixed intimately to the surface which may take up a concave or a convex form. The substrate could then have a self-adhesive backing to enable it to be applied to the surface.

In the case of an embossed pattern with a saw-toothed profile, the flanks of the teeth can be coloured so that, referred to the centre of the concave/convex surface, the flank on the outer side of every tooth bears one colour and the flank on the inner side of every tooth bears another, different colour. When the surface (which may be the lid of a jar) takes up a concave form, then incident light will be reflected predominantly from the outer flanks. When the surface takes up a convex form, incident light will be predominantly reflected from the inner flanks. The surface will therefore appear to be one colour if it is in a convex state and the other colour if it is in a concave state. This enables a quick visual inspection to be made to indicate the state of the surface and, in the case of the tops of foodstuffs containers, enables a large number of containers on a shelf to be quickly inspected to see whether the vacuum seal (the vacuum holding the surface in its concave form) is still intact on all of them.

The surface is most likely to be circular or generally circular, although other shapes are possible. The surface may be a small part of a larger surface area. For example, a specific region on the top or side of a metal can or on a vacuum sealed rigid plastics container can be formed so that it can change state, from convex to concave depending on whether it is still influenced by an internal vacuum.

The scale of the embossed pattern can be similar to that already known in respect of conventional foil blocking techniques. For example, the peak to peak dimension between adjacent tooth profiles could be between one and five hundred microns. The peak to trough dimension is likely to be about 50% of the peak to peak dimension.

The embossed pattern with differently coloured regions could be formed directly in a foil layer and the resulting pre-embossed foil could then be applied to a surface by conventional foil blocking or other techniques. In this case, the peak to peak dimension could be further reduced to about 50 nm.

Specific applications of the invention are a foodstuffs container for containing food under vacuum wherein a part of the container wall includes a surface as set forth above. The container may be a jar, and the surface can be on a lid for the jar.

Still further, the invention provides a substrate to be applied to a surface, the substrate having on it a pattern having the characteristic of displaying one visible form when the surface is concave and a different visible form when the surface is convex.

The invention will now be further described, by way of example, with reference to the accompanying drawings, in which.

Figure 8:
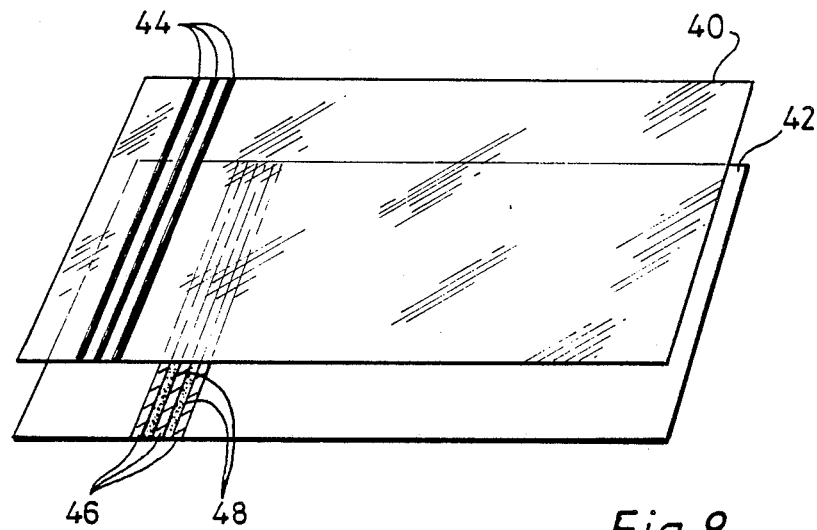
Figure 9:
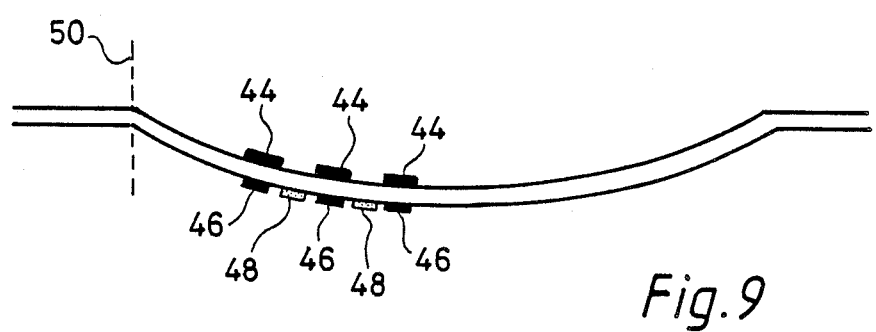
Figure 10:
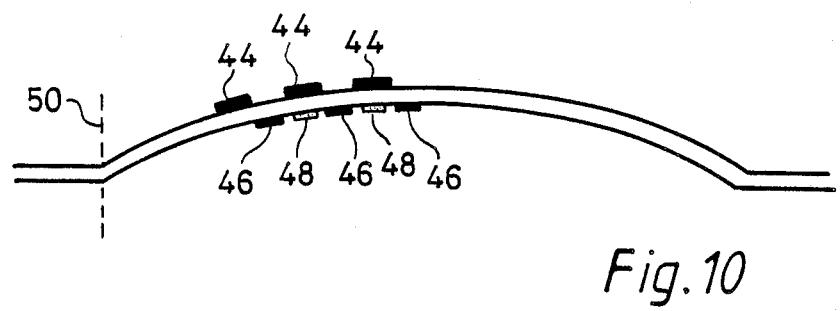

FIGS. 8, 9 and 10 together illustrate an alternative form of surface in accordance with the invention.

Figure 1:
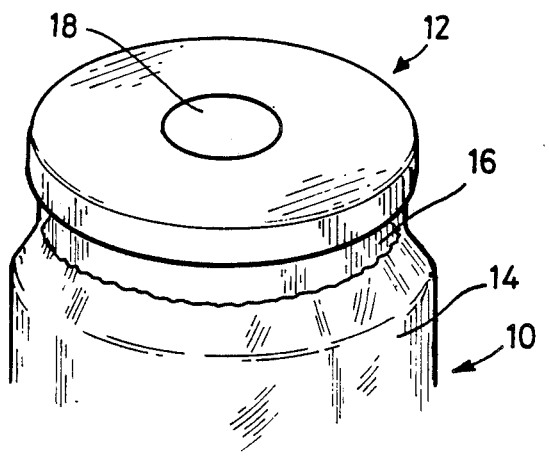
FIG. 1 is a perspective view of a jar with a lid.

FIG. 1 shows a jar 10 with a lid 12. The jar contains foodstuffs 14, and the space 16 between the foodstuffs 14 and the lid contains a vacuum which causes the centre of the lid 12 to be sucked down into the jar to take up a concave configuration.

In fact the lid has a central circular region 18, the state of which indicates the condition of the jar contents. This central region 18 is sucked into a concave shape by the vacuum in the jar, but if the vacuum is released, the region 18 reverses its curvature and becomes convex. This characteristic reversal of curvature on application/removal of vacuum is produced by appropriate shaping and treatment of the (metal) lid 12, as is already known. In practice, with such jars, the consumer will check the state of the region 18 with a thumb; if the thumb can press the region down, then there is no vacuum inside the jar 10. If the vacuum is correctly maintained then the region 18 will already have been depressed by the vacuum and will not yield to thumb pressure.

This test, although providing an effective way of indicating whether or not the jar contents are safe, does require each individual jar to be tested, one at a time.

Figure 2:
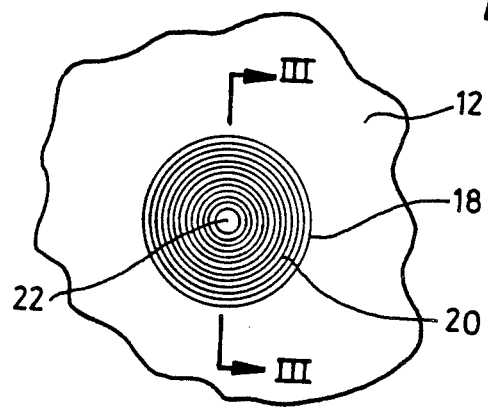
FIG. 2 is a plan view of the lid of the jar in FIG. 1.
Figure 3:
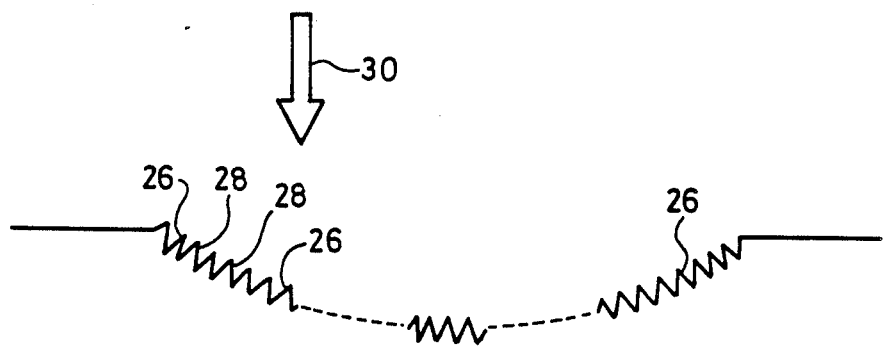
FIGS. 3 and 4 are sections through the lid of FIG. 2 with the lid shown, respectively, in its concave and convex forms.
Figure 4:
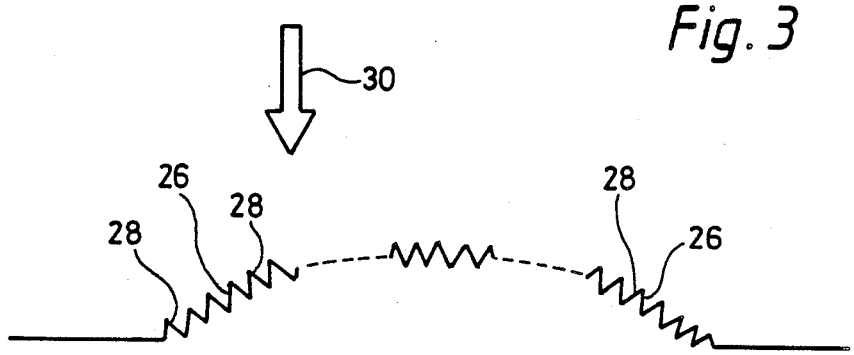

FIG. 2 shows in plan view how a series of concentric rings 20 are applied to this central region 18. FIGS. 3 and 4 show that these rings are in fact formed by sawtooth profiles embossed on the lid and that there are outer flanks 26 and inner flanks 28. One set of flanks would be coloured one colour and the other set of flanks would be coloured a different colour.

When the region 18 is in a concave form as shown in FIG. 3, incident light in the direction of the arrow 30 will be primarily reflected from the outer flanks 26, because the inner flanks 28 are generally parallel to the direction of incident light. Inspection of the surface will therefore show the whole of the region 18 as having the colour of the outer flanks 26.

However, when the region 18 changes to a convex form as is shown in FIG. 4, then the incident light 30 will be primarily reflected from the inner flanks 28, with the outer flanks 26 this time lying parallel to the incident light. The whole of the region 18 will therefore appear to have the colour of the inner flanks 28.

Thus, when the curvature of the region 18 changes from concave (FIG. 3) to convex (FIG. 4) the colour of the light reflected from this region will change. The consumer can look at the colour on the surface on the lid to see whether the vacuum in the jar has been released.

The colours can be applied to the flanks 26 and 28 by a known foil blocking process.

Figure 5:
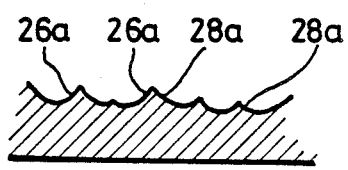
FIG. 5 is a section through an alternative embossed pattern.

FIG. 5 shows a cross-section through an alternative embossed pattern, produced by indenting the surface with a generally spherically-tipped needle. It will be seen that the pattern is not regular, but does still exhibit flanks 26a and 28a which are at angles to the surface such that incident light will be reflected from either one or other of the flanks, depending on whether the surface is concave or convex.

Figure 6:
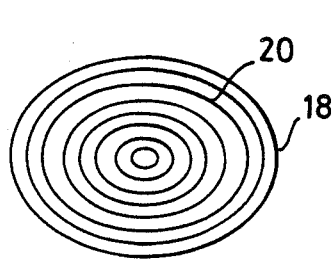
FIGS. 6 and 7 show alternative pattern configurations.

The region 18 does not have to be circular. It could perhaps be elliptical as shown in FIG. 6 or could have any other appropriate shape. However, the embossed area should correspond in shape to that of the surface which will move between convex and concave states.

Figure 7:
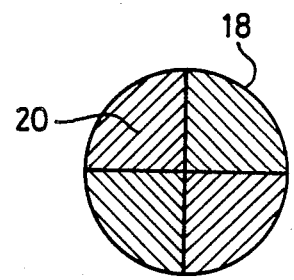

Furthermore, the embossed pattern does not have to be concentric but could, for example, have a "spider's web" arrangement as shown in FIG. 7.

The invention described allows a very simple check to be made of whether or not the lids of vacuum packed jars are still in their original, properly sealed condition.

FIGS. 8, 9 and 10 show an alternative method of carrying out this invention.

In FIG. 8 two superimposed layers 40 and 42 are shown. In the drawing these layers are shown spaced apart, so that their form can be seen but in practice they will be lying on top of one another with substantially no air gap between them. The top layer 40 is a transparent sheet on which opaque grid lines 44 are marked. The sheet 40 therefore has alternate transparent and opaque bands.

The layer 42 carries on its face in contact with the layer 40 bands 46, 48 corresponding to two alternate visible forms. The width of the bands corresponds to the width of the transparent and opaque bands in the layer 40.

The way in which this arrangment produces the desired effect is illustrated with reference to FIGS. 9 and 10 where a small number only of the bands are illustrated schematically on the two layers 40 and 42.

It is of the essence in this embodiment that there is a relative movement between the two layers when the surface shape changes from concave to convex. To this end, the layers 40 and 42 are fixed in relation to one another at one point of the concave/convex region, and this is shown at 50 at one side in FIGS. 9 and 10. At the other side of the region, some relative movement is allowed.

In the concave position shown in FIG. 9, the bands 48 corresponding to one of the visible forms can be seen between the opaque bands 44 on the upper layer 40. In FIG. 10 however the upper layer 40 has been displaced relative to the lower layer, and now the bands 46 are visible between the opaque bands 44, thus changing the appearance of the surface.

With such an arrangment, the relative movement between the two layers will vary depending on the distance from the fixed point 50. The width of the bands 44, 46, 48 could be graded to fit in with this difference in relative movement. It would be possible for the fixed point 50 to be at the centre of the convex/concave region.

Other types of colour change mechanism beyond those described here are possible for use in the invention. One such mechanism could involve the use of polarised light.

Although the foregoing detailed description of the invention has related to vacuum packed jars, the invention is not restricted to this particular application, and may, in fact, find a use wherever the change of a surface from concave to convex, or vice versa, signals a change of condition. Other applications where the invention could be used are in tin cans, where part of the metal can itself could be formed with an area movable from a concave to a convex form, and rigid plastics containers.

I claim:

1. A method of indicating the condition of a flexible domed surface which may take up a concave or convex form, wherein a pattern is applied to the surface, the pattern having the characteristic of displaying one visible form when the surface is concave and a different visible form when the surface is convex.

2. A method as claimed in claim 1, wherein the visible forms are colours, with said one visible form being a different colour from that of said different visible form.

3. A surface which may take up a concave or convex form, wherein an embossed pattern is applied to the surface, the pattern having first regions corresponding to one visible form and second regions corresponding to a different visible form, all the first regions having a common characteristic orientation relative to the surface and all the second regions having another, different, characteristic orientation relative to the surface, such that when the surface takes up a concave form, light is reflected predominantly from said first regions and when the surface takes up a convex form, light is reflected predominantly from said second regions.

4. A surface as claimed in claim 3, wherein the different visible forms are different colours.

5. A surface as claimed in claim 3, wherein the pattern is a regular pattern.

6. A surface as claimed in claim 3, wherein the pattern is an irregular pattern.

7. A surface as claimed in claim 6, wherein the pattern is an irregular pattern produced by indenting the surface with a generally spherically-tipped needle.

8. A surface as claimed in claim 4, wherein the colours are laid down by a foil-blocking technique.

9. A surface as claimed in claim 4, wherein the surface itself is of a colour suitable to reflect light and only a single colour is applied to one of the regions.

10. A surface as claimed in claim 3, wherein the embossed pattern has a saw-toothed profile when seen in cross-section, with the flank on one side of one tooth carrying one visible form and the flank on the other side of the same tooth bearing a different visible form.

11. A surface as claimed in claim 3, wherein the embossed pattern is applied to a separate substrate which is subsequently fixed intimately to the surface.

12. A flexible domed surface which may take up a concave or a convex form, the surface having two superimposed layers, which are displaced relative to one another when the surface changes between its concave and its convex form, wherein the top layer has a grid formation which allows light to be transmitted through some regions of the layer but not through others, and the lower layer carries two different patterns, one of which registers with the grid formation when the surface is concave and the other of which registers with the grid formation when the surface is convex, such that when the surface is concave, light is reflected from said one of the patterns and when the surface is convex, light is reflected from the other of the patterns.

13. A surface as claimed in claim 12, wherein the top layer is a transparent film to which opaque grid lines have been applied.

14. A surface as claimed in claim 12, wherein the top layer is arranged to transmit only polarised light, in a grid formation.

15. A surface as claimed in claim 3 or claim 12 and which is circular.

16. A surface as claimed in claim 3 or claim 12, which is a small part of a larger surface area.

17. A substrate to be applied to a surface, the substrate having on it a pattern having first regions corresponding to one visible form and second regions corresponding to a different visible form, such that when the surface flexes to a concave form, light is reflected predominantly from said first regions and when the surface flexes to a convex form, light is reflected predominantly from said second regions.

18. A substrate as claimed in claim 17, having a self adhesive backing.

* * * * *